(12) United States Patent
Zeng

(10) Patent No.: US 10,546,125 B1
(45) Date of Patent: Jan. 28, 2020

(54) SYSTEMS AND METHODS FOR DETECTING MALWARE USING STATIC ANALYSIS

(71) Applicant: Symantec Corporation, Mountain View, CA (US)

(72) Inventor: Zhicheng Zeng, Jalan Batu (SG)

(73) Assignee: CA, Inc., San Jose, CA (US)

( * ) Notice: Subject to any disclaimer, the term of this patent is extended or adjusted under 35 U.S.C. 154(b) by 230 days.

(21) Appl. No.: 15/431,794

(22) Filed: Feb. 14, 2017

(51) Int. Cl.
*G06F 21/56* (2013.01)
*G06F 8/75* (2018.01)

(52) U.S. Cl.
CPC .............. *G06F 21/563* (2013.01); *G06F 8/75* (2013.01); *G06F 2221/033* (2013.01)

(58) Field of Classification Search
CPC ................................ G06F 21/562; G06F 8/75
See application file for complete search history.

(56) References Cited

U.S. PATENT DOCUMENTS

| 9,411,964 | B1* | 8/2016 | Moritz | G06F 21/577 |
| 2003/0065926 | A1* | 4/2003 | Schultz | G06F 21/562 |
| | | | | 713/188 |

OTHER PUBLICATIONS

Chen et al., "Non-Control-Data Attacks Are Realistic Threats" USENIX Security Symposium. vol. 5. 2005, pp. 177-191 (Year: 2005).*
Concolic Testing, https://en.wikipedia.org/wiki/Concolic_testing (Dec. 24, 2016).

* cited by examiner

*Primary Examiner* — Harunur Rashid
(74) *Attorney, Agent, or Firm* — FisherBroyles, LLP

(57) ABSTRACT

The disclosed computer-implemented method for detecting malware using static analysis may include (i) identifying an executable file to subject to analysis for malware, (ii) retrieving an association between a known malicious behavior and an exploitable method being invoked, wherein the association specifies that a contextual method precedes the exploitable method in an invocation path and that the exploitable method is invoked with a set of predetermined parameters, (iii) detecting, within the executable file, an invocation of the exploitable method, (iv) determining that the invocation of the exploitable method within the executable file occurs in a detected invocation path in which the contextual method precedes the exploitable method and that the invocation of the exploitable method includes a set of invoking parameters that matches the set of predetermined parameters, and (v) classifying the executable file as containing malware. Various other methods, systems, and computer-readable media are also disclosed.

18 Claims, 7 Drawing Sheets

SYSTEMS AND METHODS FOR DETECTING MALWARE USING STATIC ANALYSIS

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures to their customers on a regular basis. However, a significant amount of malware has not yet been identified and, therefore, may not be represented in traditional malware signature databases, particularly since malware authors may regularly modify their malware in an attempt to circumvent commonly employed signature-based malware-detection mechanisms. Malware authors may apply obfuscation techniques to quickly generate countless variants of a malware sample with little effort. As malware variants proliferate, security software companies may struggle to keep up in the race to identify, analyze, and create signatures for detecting new variants.

The instant disclosure, therefore, identifies and addresses a need for systems and methods for detecting malware using static analysis.

SUMMARY

As will be described in greater detail below, the instant disclosure describes various systems and methods for detecting malware using static analysis.

In one example, a computer-implemented method for detecting malware using static analysis may include (i) identifying an executable file to subject to analysis for malware, (ii) retrieving an association between a known malicious behavior and an exploitable method being invoked, wherein the association specifies that a contextual method precedes the exploitable method in an invocation path and that the exploitable method is invoked with a set of predetermined parameters, (iii) detecting, within the executable file, an invocation of the exploitable method, (iv) determining, based on analyzing contents of the executable file, that the invocation of the exploitable method within the executable file occurs in a detected invocation path in which the contextual method precedes the exploitable method and that the invocation of the exploitable method includes a set of invoking parameters that matches the set of predetermined parameters, and (v) classifying the executable file as containing malware in response to determining that the invocation of the exploitable method within the executable file occurs in the detected invocation path in which the contextual method precedes the exploitable method and that the exploitable method is invoked with the set of predetermined parameters.

In some examples, the computer-implemented method may further include performing a security action in response to classifying the executable file as containing malware.

In some examples, determining that the invocation of the exploitable method may include the set of predetermined parameters may include: identifying, within the executable file, a data propagation path between a symbolic identifier used within the invocation of the exploitable method to designate an invoking parameter of the exploitable method and a concrete value and determining that the concrete value matches a predetermined parameter within the set of predetermined parameters corresponding to the invoking parameter.

In some examples, determining that the invocation of the exploitable method occurs in the detected invocation path may include constructing a representation of a method call trace based on a static analysis of the executable file.

In some examples, determining that the invocation of the exploitable method occurs in the detected invocation path may include determining that a preceding method call within the detected invocation path invokes a succeeding method call within the detected invocation path.

In one embodiment, the executable file includes class-based object-oriented executable instructions and detecting, within the executable file, an invocation of the exploitable method includes identifying a name of a member of a class within the executable file.

In one embodiment, detecting, within the executable file, the invocation of the exploitable method may include analyzing bytecode disassembled from the executable file.

In some examples, the computer-implemented method may further include generating a malware signature based on content within the executable file in response to classifying the executable file as containing malware.

In one embodiment, the association between the known malicious behavior and the exploitable method being invoked is based at least in part on an event that triggers the contextual method.

In one embodiment, a system for implementing the above-described method may include (i) an identification module, stored in memory, that identifies an executable file to subject to analysis for malware, (ii) a retrieving module, stored in memory, that retrieves an association between a known malicious behavior and an exploitable method being invoked, wherein the association specifies that a contextual method precedes the exploitable method in an invocation path and that the exploitable method is invoked with a set of predetermined parameters, (iii) a detection module, stored in memory, that detects, within the executable file, an invocation of the exploitable method, (iv) a determination module, stored in memory, that determines, based on analyzing contents of the executable file, that the invocation of the exploitable method within the executable file occurs in a detected invocation path in which the contextual method precedes the exploitable method and that the invocation of the exploitable method includes a set of invoking parameters that matches the set of predetermined parameters, (v) a classification module, stored in memory, that classifies the executable file as containing malware in response to determining that the invocation of the exploitable method within the executable file occurs in the detected invocation path in which the contextual method precedes the exploitable method and that the exploitable method is invoked with the set of predetermined parameters, and (vi) at least one physical processor configured to execute the identification module, the retrieving module, the detection module, the determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an executable file to subject to analysis for malware, (ii) retrieve an association between a known malicious behavior and an exploitable method being invoked, wherein the association specifies that a contextual method precedes the exploitable method in an invocation path and that the exploitable method is invoked with a set of predetermined parameters, (iii) detect, within the executable file, an invocation of the exploitable method, (iv) determine, based on analyzing contents of the executable file, that the invocation of the exploitable method within the executable file occurs in a detected invocation path in which the contextual method precedes the exploitable method and that the invocation of the exploitable method includes a set of invoking parameters that matches the set of predetermined parameters, and (v) classify the executable file as containing malware in response to determining that the invocation of the exploitable method within the executable file occurs in the detected invocation path in which the contextual method precedes the exploitable method and that the exploitable method is invoked with the set of predetermined parameters.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
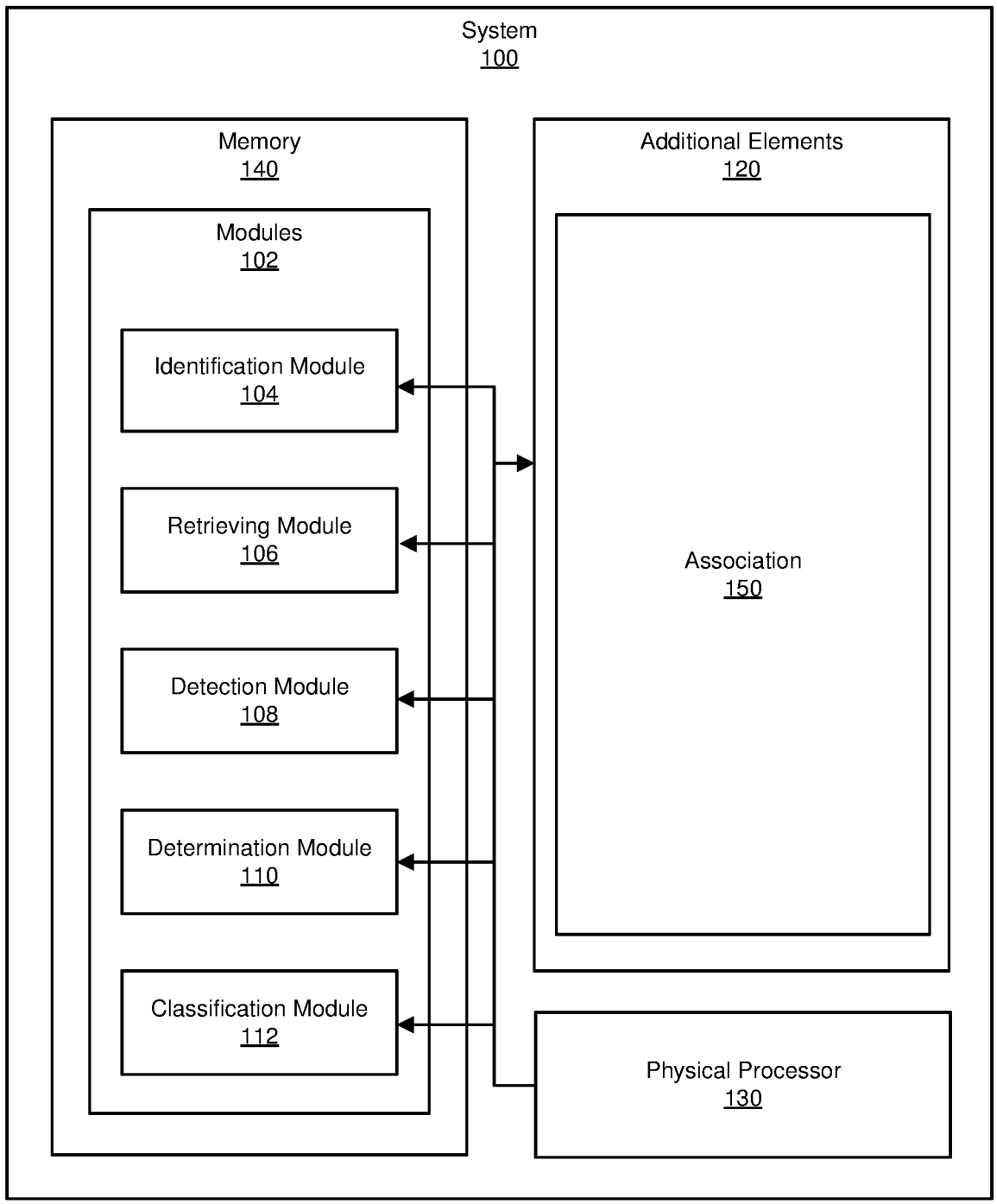
FIG. 1 is a block diagram of an example system for detecting malware using static analysis.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting malware using static analysis. As will be explained in greater detail below, by defining malware in terms of malicious behaviors that exploit method calls in particular contexts and/or with particular patterns, detecting in executable files method calls known to be exploitable, and analyzing the content of the executable files to identify originating method calls and/or originating data sources for method call parameters, the systems and methods described herein may reliably and accurately identify malware that may otherwise be obfuscated from signature-based detection. In addition, in some examples, upon identifying malware within an executable file, the systems and methods described herein may generate signatures based on the content of the executable file to facilitate future detection of the malware and/or related variants.

In addition, the systems and methods described herein may improve the functioning of a computing device by improving the malware classification capabilities of the device. Furthermore, these systems and methods may improve the functioning of a computing device by improving the security of the device (e.g., by reducing false negatives and, therefore, more consistently remediating malware). In addition, these systems and methods may improve the functioning of a computing device by reducing false positives produced by security systems using less reliable detection methods and thereby (i) reducing the interference of security systems with legitimate programs, files, and operations and (ii) reducing the computational burden that would be placed on computing resources when taking unnecessary remediation actions (and, therefore, improving the capability of the computing device to execute primary applications with to high performance standards). Furthermore, these systems and methods may improve the functioning of a computing device by improving the performance of processes that analyze files (e.g., each file that is created on and/or transferred to the computing device in the case of an endpoint device, or each file analyzed by a central security system in the case of a security server) by more efficient and/or effective analysis techniques.

Figure 2:
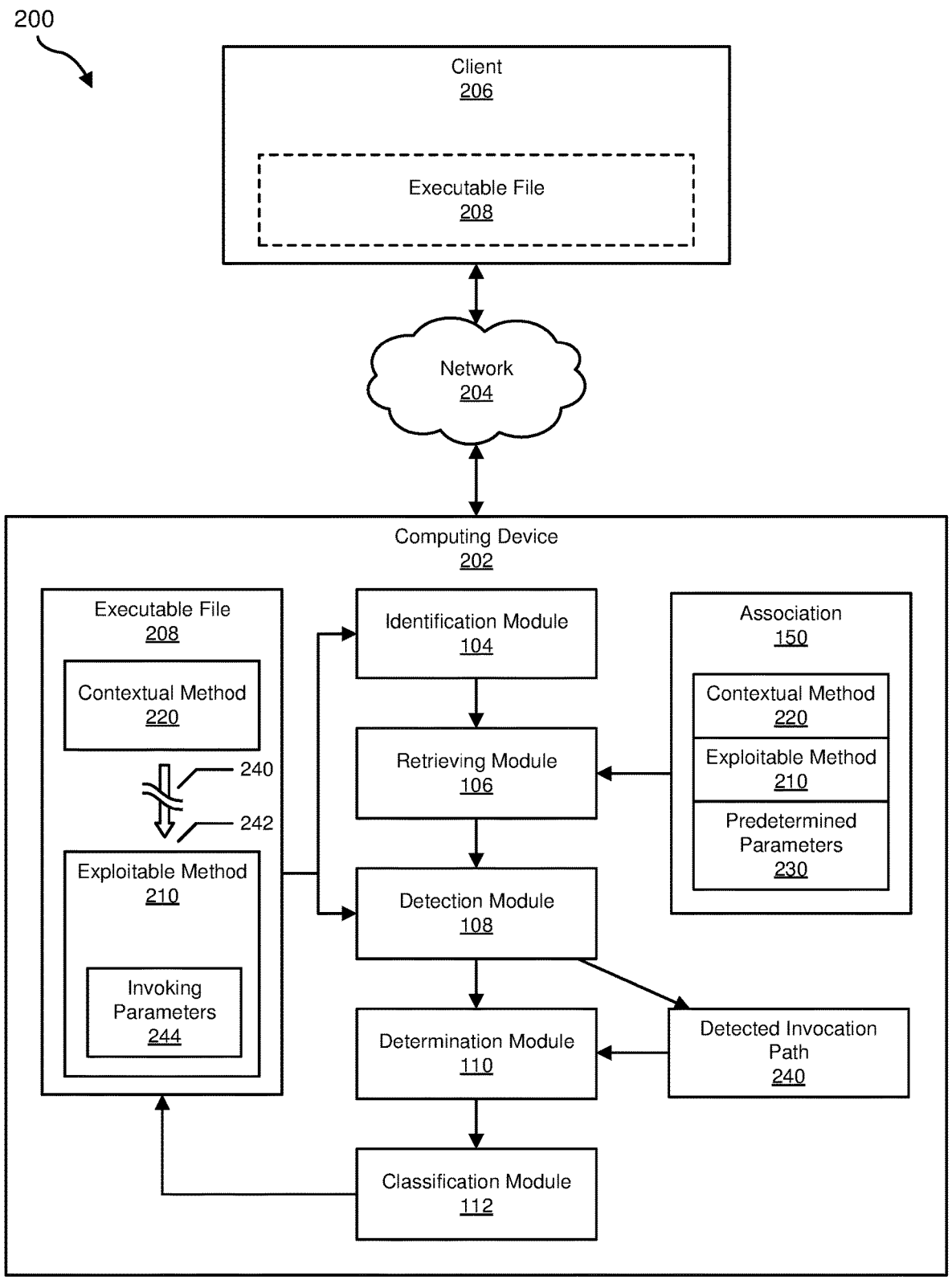
FIG. 2 is a block diagram of an additional example system for detecting malware using static analysis.

The following will provide, with reference to FIGS. 1-2, detailed descriptions of example systems for detecting malware using static analysis. Detailed descriptions of corresponding computer-implemented methods will also be provided in connection with FIG. 3. Detailed descriptions of example mappings of method invocation and data propagation will be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of example system 100 for detecting malware using static analysis. As illustrated in this figure, example system 100 may include one or more modules 102 for performing one or more tasks. For example, and as will be explained in greater detail below, example system 100 may include an identification module 104 that identifies an executable file to subject to analysis for malware. Example system 100 may additionally include a retrieving module 106 that retrieves an association between a known malicious behavior and an exploitable method being invoked, wherein the association specifies that a contextual method precedes the exploitable method in an invocation path and that the exploitable method is invoked with a set of predetermined parameters. Example system 100 may also include a detection module 108 that detects, within the executable file, an invocation of the exploitable method. Example system 100 may additionally include a determination module 110 that determines, based on analyzing contents of the executable file, that the invocation of the exploitable method within the executable file occurs in a detected invocation path in which the contextual method precedes the exploitable method and that the invocation of the exploitable method includes a set of invoking parameters that matches the set of predetermined parameters. Example system 100 may also include a classification module 112 that classifies the executable file as containing malware in response to determining that the invocation of the exploitable method within the executable file occurs in the detected invocation path in which the contextual method precedes the exploitable method and that the exploitable method is invoked with the set of predetermined parameters. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or client 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malware using static analysis. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. For example, system 100 may include an association 150. In some examples, association 150 may represent a data structure that identifies an association between malware and/or malicious behavior with an invocation of a method in a specified context and/or with specified parameters. In some examples, association 150 may be stored in a database along with other similarly defined associations.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a client 206 via a network 204. In one example, all or a portion of the functionality of modules 102 may be performed by computing device 202, client 206, and/or any other suitable computing system. As will be described in greater detail below, one or more of modules 102 from FIG. 1 may, when executed by at least one processor of computing device 202 and/or client 206, enable computing device 202 and/or client 206 to detect malware using static analysis. For example, and as will be described in greater detail below, one or more of modules 102 may cause computing device 202 (e.g., operated by a security vendor) to identify an executable file 208 as malicious (and, e.g., thereby prevent executable file 208 from adversely impacting endpoint systems, such as client 206). For example, and as will be described in greater detail below, identification module 104 may identify executable file 208 to subject to analysis for malware. Retrieving module 106 may retrieve association 150 between a known malicious behavior and an exploitable method 210 being invoked, wherein association 150 specifies that a contextual method 220 precedes exploitable method 210 in an invocation path and that exploitable method 210 is invoked with a set of predetermined parameters 230. Detection module 108 may detect, within executable file 208, an invocation 242 of exploitable method 210. Determination module 110 may determine, based on analyzing contents of executable file 208, that invocation 242 of exploitable method 210 within executable file 208 occurs in a detected invocation path 240 in which contextual method 220 precedes exploitable method 210 and that an invocation 242 of exploitable method 210 comprises a set of invoking parameters 244 that matches the set of predetermined parameters 230. Classification module 112 may classify executable file 208 as containing malware in response to determining that invocation 242 of exploitable method 210 within executable file 208 occurs in detected invocation path 240 in which contextual method 220 precedes exploitable method 210 and that exploitable method 210 is invoked with the set of predetermined parameters 230.

Computing device 202 generally represents any type or form of computing device capable of reading computer-executable instructions. For example, computing device 202 may represent a security server and/or a computing system operated by a security vendor. Additional examples of computing device 202 include, without limitation, security servers, application servers, web servers, storage servers, and/or database servers configured to run certain software applications and/or provide various security, web, storage, and/or database services. Although illustrated as a single entity in FIG. 2, computing system 202 may include and/or represent a plurality of computing systems that work and/or operate in conjunction with one another.

Client 206 generally represents any type or form of computing device that is capable of reading computer-executable instructions. In some examples, client 206 may represent an endpoint computing device (e.g., in communication with a security server to receive identifications of and/or instructions regarding potential malware). Additional examples of client 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. In one example, network 204 may facilitate communication between computing device 202 and client 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
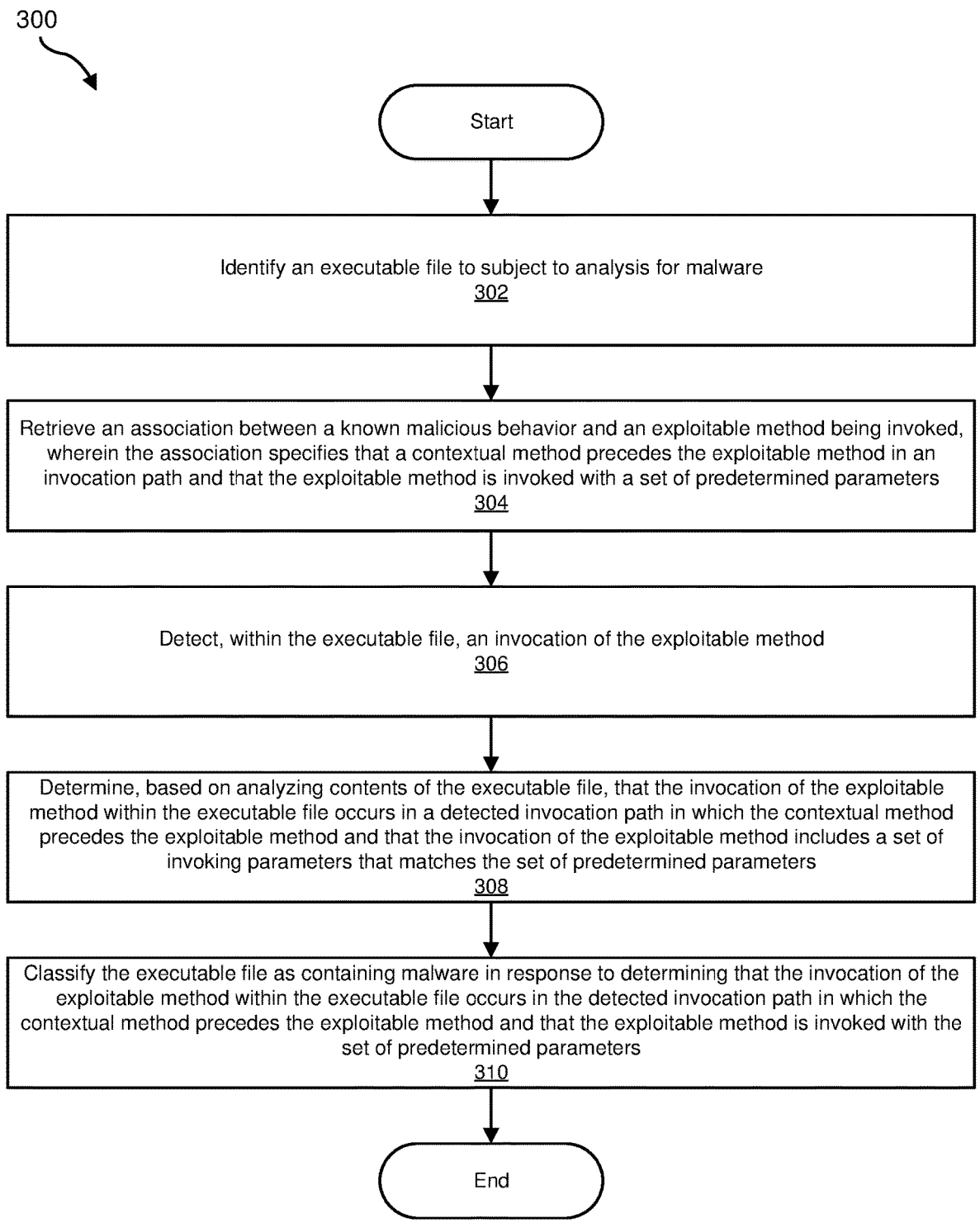
FIG. 3 is a flow diagram of an example method for detecting malware using static analysis.

FIG. 3 is a flow diagram of an example computer-implemented method 300 for detecting malware using static analysis. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an executable file to subject to analysis for malware. For example, identification module 104 may, as part of computing device 202 in FIG. 2, identify executable file 208 to subject to analysis for malware.

Identification module 104 may identify the executable file in any suitable context. For example, identification module 104 may identify the executable file by receiving the executable file from another system (e.g., as a part of a query regarding the safety of the executable file). In some examples, identification module 104 may identify the executable file within a repository of files to be analyzed for malware. In some examples, identification module 104 may identify the executable file by crawling a network (e.g., the Internet) for files (e.g., to analyze for potential malware). In some examples, identification module 104 may identify the executable file by determining that the executable file has been flagged as suspicious, by identifying a download of the executable file, by identifying a creation of the executable file, and/or by identifying an attempt to execute the executable file. In some examples, identification module 104 may identify the executable file by extracting the executable file from an application package file. Additionally or alternatively, identification module 104 may identify the executable file by disassembling an assembled version of the executable file.

The term "executable file," as used herein, may refer to any collection of executable instructions. In some examples, the term "executable file" may refer to a bytecode file executed within an interpreter. Additionally or alternatively, the term "executable file" may refer to a collection of disassembled instructions. In some examples, the term "executable file" may refer to a DALVIK executable file (e.g., a file for an application that runs on DALVIK which may execute on a GOOGLE ANDROID platform (e.g., a mobile computing device). Additionally or alternatively, the term "executable file" may refer to a disassembled DALVIK executable file (e.g., a smali code file). In some examples, the executable file may include class-based object-oriented executable instructions. For example, the executable file may include class names and/or class member names (including, e.g., member method names). Additional examples of executable files may include portable executable files, native executable files, library files (such as dynamic linked libraries and dynamic shared objects), and/or script files.

The term "malware," as used herein, generally refers to any malicious, unauthorized, and/or illegitimate software and/or data object that may operate within and/or interact with a computing device. Examples of malware may include, without limitation, Trojans, spyware, adware, worms, rootkits, and/or viruses. In some embodiments, malware may perform malicious actions including but not limited to disrupting the function of a computing device, disabling access to one or more features of a computing device, deleting files, encrypting files, stealing private information, transmitting private information, making unauthorized use of computing resources, launching and/or participating in attacks on other computing systems, and/or recording activity.

Returning to FIG. 3, at step 304, one or more of the systems described herein may retrieve an association between a known malicious behavior and an exploitable method being invoked, wherein the association specifies that a contextual method precedes the exploitable method in an invocation path and that the exploitable method is invoked with a set of predetermined parameters. For example, retrieving module 106 may, as part of computing device 202 in FIG. 2, retrieve association 150 between a known malicious behavior and exploitable method 210 being invoked, wherein association 150 specifies that contextual method 220 precedes exploitable method 210 in an invocation path and that exploitable method 210 is invoked with a set of predetermined parameters 230.

The term "malicious behavior," as used herein, generally refers to any malicious, unauthorized, and/or illegitimate operation on and/or interaction with a computing device. In some examples, the term "malicious behavior" may refer to a behavior that may facilitate the successful operation of malware.

As used herein, the term "association," as it relates to malicious behaviors and associated methods, generally refers to any characterization of an invocation of a method within an executable file as potentially malicious. In some examples, the association may be represented by a data structure that defines one or more attributes of a suspect method invocation. For example, the association may be represented by a data structure that defines a context within which an invocation of a method is suspect (e.g., if the method is invoked in a chain of method invocations that includes a particular method earlier in the chain) and/or parameters with which the method is invoked that, in context, may indicate that the invocation of the method is suspect. In some examples, the association may be stored in a database of associations between malicious behaviors and suspect method invocation patterns. In one embodiment, the association between the known malicious behavior and the exploitable method being invoked may be based at least in part on an event that triggers the contextual method. Examples of events that may trigger the contextual method may include the launching of an application, the initialization of a phone call, and/or the sending of a text message. For example, if the contextual method is automatically invoked when an application is launched, the invocation of the contextual method leads to the invocation of the exploitable method, and the exploitable method (e.g., with particular parameters) causes an icon representing the application to be hidden, the invocation of the exploitable method may, in context, represent potentially malicious behavior.

The term "method," as used herein, generally refers to any method, application programming interface ("API"), function, subroutine, and/or procedure. In some examples, a method may be invoked with one or more parameters (e.g., which may at least partly determine the behavior of the method and/or the return value of the method). In some examples, a method may invoke another method. In some examples, a method may be associated with a class defined in a class-based object-oriented application. For example, a method may be a member of a class.

The term "exploitable method," as used herein, generally refers to a method that may be used to cause and/or facilitate malicious behavior. For example, an exploitable method may be exploited by being invoked in certain contexts and/or with certain parameters. In some examples, one or more exploitable methods may be identified (e.g., by name) as exploitable within a database of associations between malicious behaviors and exploitable methods.

The term "contextual method," as used herein, generally refers to any method that is associated with a context of interest for evaluating whether an exploitable method is being exploited. execution. For example, a contextual method may indicate a context in which instructions are being executed based on links between the contextual method and events that correlate with and/or cause the invocation of the contextual method. For example, if an exploitable method is invoked when a contextual method is invoked (e.g., because the contextual method invokes the exploitable method and/or invokes one or more intermediate methods that eventually lead to the invocation of the exploitable method) and the contextual method is invoked when an event of interest (e.g., the launching of an application, the sending of a text message, etc.) occurs, the contextual method may indicate that the exploitable method is invoked in the context of the event of interest.

The term "invocation path," as used herein, generally refers to any sequence of method invocations, where the invocation of a method in the sequence implies an invocation of a method earlier in the sequence. For example, the term "invocation path" may refer to a sequence of methods in which each method in the sequence invokes the subsequent method.

The term "parameter," as used herein, generally refers to any parameter, argument, data, variable, and/or expression provided as input to a method. In some examples, a method may be invoked with a constant value as a parameter. In some examples, a method may be invoked with any of a variety of expressions as parameters. For example, a method may be invoked with another method call as a parameter (e.g., using the return value of the method call as the parameter). In addition, a method may be invoked with any number of parameters. In some examples, a method may be defined to allow a variable number of parameters. Accordingly, the term "set" as it applies to parameters may refer to a set of any number of parameters (e.g., zero, one, or multiple parameters). Thus, in some examples, the systems and methods described herein may determine that a set of parameters matches a predefined set of parameters by determining that a method that may be called with a variable number of parameters is called with zero parameters.

Retrieving module 106 may retrieve the association between the known malicious behavior and the exploitable method in any of a variety of ways. For example, retrieving module 106 may load one or more associations between malicious behaviors and exploitable methods from a database of such associations. Additionally or alternatively, retrieving module 106 may retrieve the association in response to determining that the executable file includes (or potentially includes) an invocation of the exploitable method.

Returning to FIG. 3, at step 306, one or more of the systems described herein may detect, within the executable file, an invocation of the exploitable method. For example, detection module 108 may, as part of computing device 202 in FIG. 2, detect, within executable file 208, invocation 242 of exploitable method 210.

Detection module 108 may detect the invocation of the exploitable method within the executable file in any suitable manner. For example, detection module 108 may detect a name and/or identifier of the method within the executable file. In some examples, the executable file may include class-based object-oriented executable instructions and detection module 108 may detect, within the executable file, the invocation of the exploitable method by identifying a name of a member of a class within the executable file.

In some examples, detection module 108 may detect, within the executable file, the invocation of the exploitable method by analyzing bytecode disassembled from the executable file. In some examples, detection module 108 may disassemble the bytecode within the executable file. In these examples, detection module 108 may then parse the disassembled instructions (e.g., to identify the invocation of the method within the disassembled instructions).

While various examples provided herein focus on detecting a single invocation of a single exploitable method, it may be appreciated that, in some examples, the systems and methods described herein may identify multiple invocations of a single exploitable method within an executable file and/or may identify invocations of various exploitable methods within an executable file. Accordingly, the systems and methods described herein may identify invocation paths for each detected invocation of each identified exploitable method detected within the executable file to analyze each detected invocation of each identified exploitable method.

Returning to FIG. 3, at step 308, one or more of the systems described herein may determine, based on analyzing contents of the executable file, that the invocation of the exploitable method within the executable file occurs in a detected invocation path in which the contextual method precedes the exploitable method and that the invocation of the exploitable method may include a set of invoking parameters that matches the set of predetermined parameters. For example, determination module 110 may, as part of computing device 202 in FIG. 2, determine, based on analyzing contents of executable file 208, that invocation 242 of exploitable method 210 within executable file 208 occurs in detected invocation path 240 in which contextual method 220 precedes exploitable method 210 and that invocation 242 of exploitable method 210 includes a set of invoking parameters 244 that matches the set of predetermined parameters 230.

Determination module 110 may determine that the invocation of the exploitable method meets of the specification of the association in any of a variety of ways.

In some examples, determination module 110 may determine that the invocation of the exploitable method includes the set of predetermined parameters by identifying, within the executable file, a data propagation path between a symbolic identifier used (e.g., as a parameter) within the invocation of the exploitable method to designate an invoking parameter of the exploitable method and a concrete value and determining that the concrete value matches a predetermined parameter within the set of predetermined parameters corresponding to the invoking parameter. Additionally or alternatively, determination module 110 may identify a data propagation path between the symbolic identifier and a value source (e.g., where the value source is suspect and/or is identified as potentially supplying the predetermined parameter as a value).

As used herein, the term "data propagation path" may refer to any series of instructions through which a value may be transmitted. For example, a data propagation path may include assigning a value to a variable, copying a value and/or passing a value as a parameter to a method.

Determination module 110 may identify the propagation path in any suitable manner. For example, determination module 110 may identify a symbolic identifier used as a parameter in the invocation of the exploitable method. Determination module 110 may then analyze the executable file to determine how a value is assigned to the symbolic identifier. Determination module 110 may thereby identify another value carrier (e.g., an expression, variable, and/or parameter) that provided the value to the symbolic identifier. Determination module 110 may then determine how the value was assigned to the previous value carrier. By iterating this process, determination module 110 may identify the value in concrete form (e.g., as a constant) and/or identify a source that supplies the value. While various examples provided herein focus on identifying a single propagation path (e.g., to identify the value source of a single parameter used in the invocation of the exploitable method), it may be appreciated that, in some examples, the systems and methods described herein may identify multiple data propagation paths (e.g., accounting for each parameter of interest in the invocation of the exploitable method). For example, the retrieved association may indicate that the exploitable method is connected with a known malicious behavior when the first, third, and fourth parameters match specified values (and/or originate from specified sources). Accordingly, the systems and methods described herein may identify at least three data propagation paths to analyze the invocation of the exploitable method (e.g., one for each of the first, third, and fourth parameters).

In some examples, determination module 110 may determine that the invocation of the exploitable method occurs in the detected invocation path by constructing a representation of a method call trace based on a static analysis of the executable file. For example, determination module 110 may construct a directed graph of method calls (e.g., where a source node with an edge directed to a target node represents a method associated with the source node invoking a method associated with the target node) and/or a data structure that is isomorphic to a directed graph.

In some examples, determination module 110 may determine that the invocation of the exploitable method occurs in the detected invocation path by determining that a preceding method call within the detected invocation path invokes a succeeding method call within the detected invocation path. In some examples, determination module 110 may determine that the invocation of the exploitable method occurs in the detected invocation path by determining that a preceding method call within the detected invocation path uniquely invokes a succeeding method call within the detected invocation path. For example, determination module 110 may determine that an invocation path exists between a candidate method and the exploitable method because an intermediate method that invokes the exploitable method could only have been invoked by the candidate method (and not, e.g., another method).

In some examples, determination module 110 may identify the detected invocation path and one or more data propagation paths using a combined representation. For example, a directed graph may include two edge types. One edge type may represent one method represented by a node invoking another method represented by another node. Another edge type may represent a value being passed from one node to another node.

Figure 4:
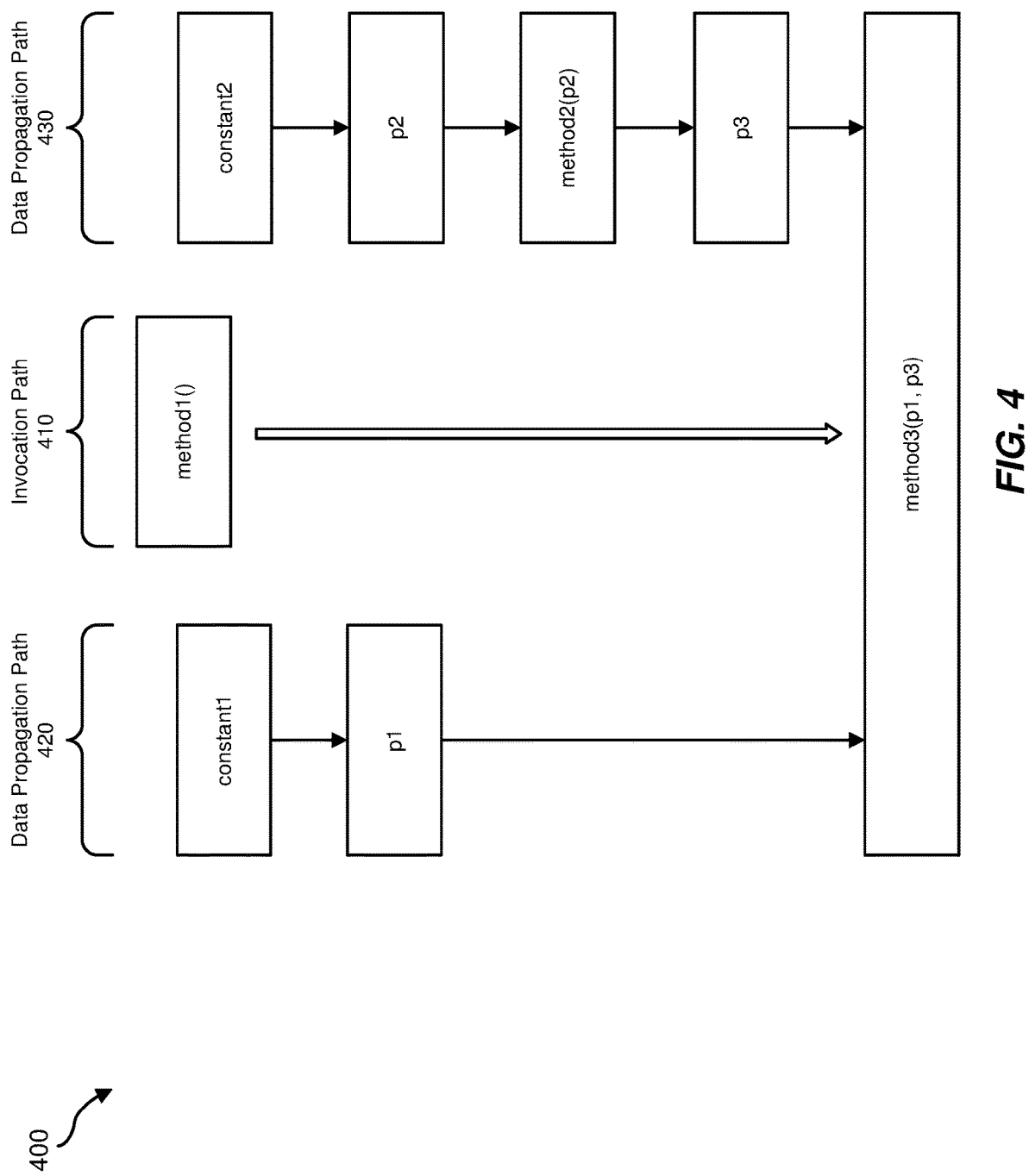
FIG. 4 is a block diagram of an example trace of method invocation and data propagation for detecting malware using static analysis.

FIG. 4 provides an illustration of an example representation 400 of an executable file in terms of invocation paths and data propagation paths. As shown in FIG. 4, representation 400 may include an invocation path 410, a data propagation path 420, and a data propagation path 430. As shown in FIG. 4, invocation path 410 may begin with an invocation of method1. Invocation path 410 may continue with an invocation of method3 using parameters p1 and p3. In one example, the systems described herein may identify the invocation of method3 as an invocation of an exploitable method (e.g., defined as exploitable by an association between the exploitable method and a known malicious behavior). Accordingly, these systems may generate invocation path 410. In one example, the systems described herein may determine (e.g., based on the association) that method1 is a contextual method that, when it precedes method3 in an invocation path, indicates a known malicious behavior (e.g., in combination with method3 being invoked with particular parameters). As further shown in FIG. 4, data propagation path 420 may relate to the propagation of constant1 to the first parameter of the invocation of method3. In some examples, the systems described herein may generate a representation of data propagation path 420 (e.g., based on determining, based on the association, that a particular value of the first parameter is a partial indication of a known malicious behavior). Likewise, the systems described herein may generate a representation of data propagation path 430 (e.g., because the second parameter of method3 may be implicated as relevant in the association between method3 and the known malicious behavior). Thus, the systems described herein may determine that constant2 provides a value to parameter p2 used in an invocation of method2, and that the return value of method2 further passes that value to parameter p3 used in the invocation of method3.

Figure 5:
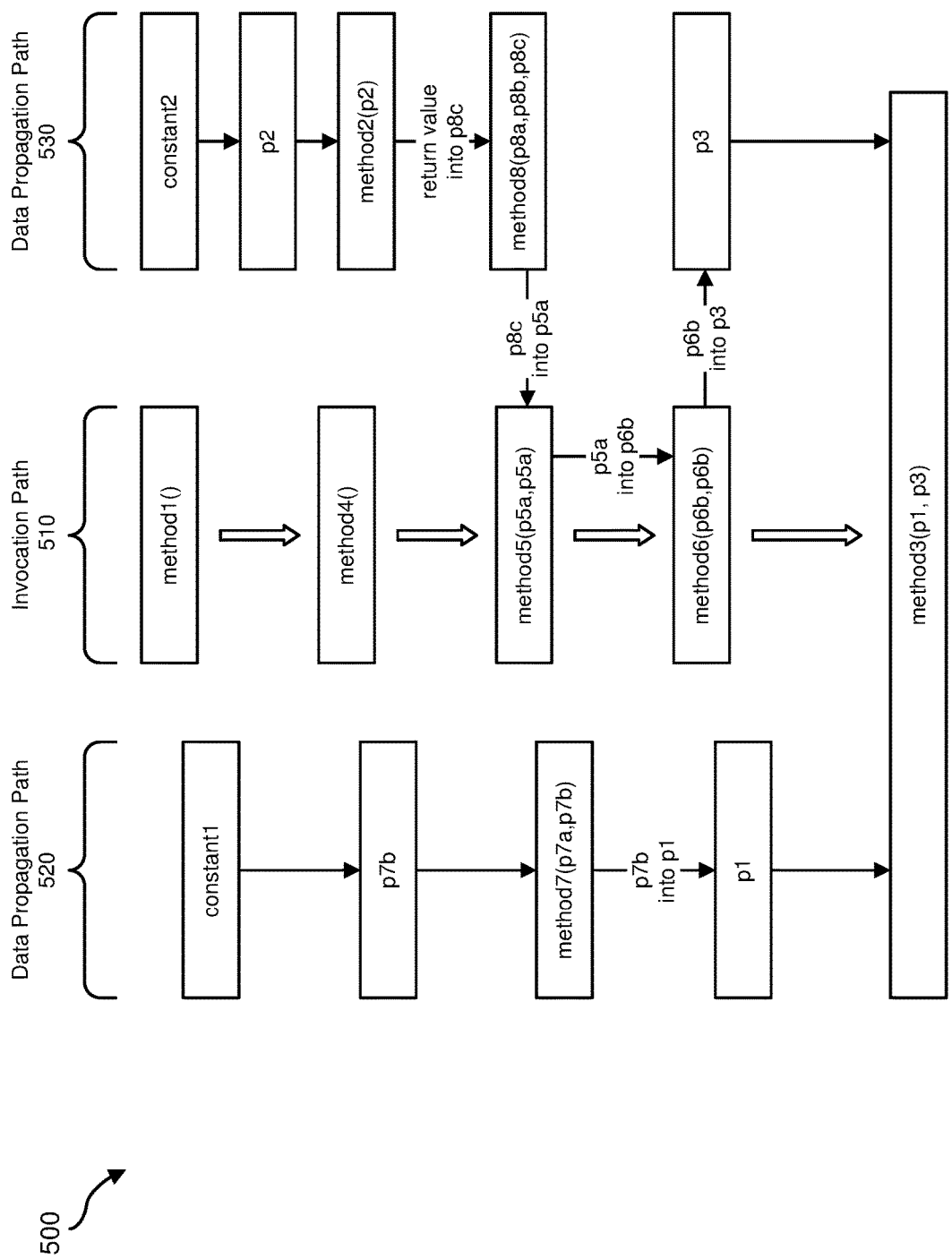
FIG. 5 is a block diagram of an example trace of method invocation and data propagation for detecting malware using static analysis.

FIG. 5 provides an illustration of an example representation 500 of an executable file in terms of invocation paths and data propagation paths. As shown in FIG. 5, representation 500 may include an invocation path 510, a data propagation path 520, and a data propagation path 530. Invocation path 510 may include method1 invoking method4, method4 invoking method5, method5 invoking method6, and method6 invoking method3. Data propagation path 520 may include constant1 providing a value assigned to parameter p7b of method7, and method7 providing the value to parameter p1 of method3 via parameter p7b. Data propagation path 530 may include constant2 providing a value assigned to parameter p2 of method2. The value may then be propagated as a return value of method2 into parameter p8c used in the invocation of method8. The value may be further propagated into parameter p5a used in the invocation of method5, then into parameter p6b used in the invocation of method6, and then into parameter p3 used in the invocation of method3. Thus, by mapping invocation path 510, the systems described herein may determine that the invocation of method3 originates with an invocation of method1. Furthermore, by mapping data propagation paths 520 and 530, the systems described herein may determine that the value of the first parameter in the invocation of method3 is constant1 and the value of the second parameter in the invocation of method3 is constant2.

It may be appreciated that FIGS. 4 and 5 represent two different sets of instructions with common features. In both FIG. 4 and FIG. 5, method3 may be invoked using the value of constant1 as the first parameter, using the value of constant3 as the second parameter, and within an invocation path that begins with method1. Accordingly, the systems and methods described herein may treat the invocation of method3 in FIG. 4 the same as the invocation of method3 in FIG. 5. Thus, these systems and methods may frustrate the attempts of malware authors attempting to circumvent detection by introducing obfuscating variants.

Returning to FIG. 3, at step 310, one or more of the systems described herein may classify the executable file as containing malware in response to determining that the invocation of the exploitable method within the executable file occurs in the detected invocation path in which the contextual method precedes the exploitable method and that the exploitable method is invoked with the set of predetermined parameters. For example, classification module 112 may, as part of computing device 202 in FIG. 2, classify executable file 208 as containing malware in response to determining that invocation 242 of exploitable method 210 within executable file 208 occurs in detected invocation path 240 in which contextual method 220 precedes exploitable method 210 and that exploitable method 210 is invoked with the set of predetermined parameters 230.

Classification module 112 may classify the executable file as containing in any suitable manner. For example, classification module 112 may, based the data propagation paths generated for the respective parameters used in the invocation of the exploitable method, determine the values of the parameters used in the invocation of the exploitable method by identifying the values at the head nodes of the respective data propagation paths. Likewise, classification module 112 may, based on the invocation path, identify a method at the head of the invocation path. Classification module 112 may then compare the values at the head nodes of the data propagation paths with the set of predetermined parameters defined by the association and may compare the method at the head of the invocation path with the contextual method defined by the association. Upon determining that the parameters match and the contextual methods match, classification module 112 may classify the executable file as malicious. In some examples, the association between the exploitable method and the malicious behavior may allow for variants. For example, the association may specify a set of contextual methods that would indicate malicious behavior and/or a range of values for a parameter that would indicate malicious behavior.

Returning to FIGS. 4 and 5, in one example, the systems described herein may identify (e.g., from an association database) an association between invocations of method3 and a malicious behavior when (a) the invocations of method3 occur in consequence of invocations of method1 and (b) the first and second parameters used to invoke method3 are "2" and "5" (respectively). Accordingly, if constant1 equals 2 and constant2 equals 5, upon determining that constant1 ultimately supplies the value for p1, that constant2 ultimately supplies the value for p3, and that the invocation of method3 occurs in an invocation path that begins with method1, the systems described herein may determine that the executable files represented in FIGS. 4 and 5 are both malicious.

In some examples, systems described herein may also perform a security action in response to classifying the executable file as containing malware. The security action may include any of a variety of actions. For example, the security action may include updating malware definitions to include the executable file, deleting the executable file, halting and/or blocking the execution of the executable file, quarantining and/or sandboxing the executable file, alerting a user, an administrator, and/or a security vendor of the executable file, removing permissions from the executable file, blocking behaviors of the executable file, and/or performing additional security scans and/or analyses of the executable file.

In some examples, systems described herein may also generate a malware signature based on content within the executable file in response to classifying the executable file as containing malware. For example, the systems described herein may identify uncommon strings within the executable file and include the uncommon strings in the malware signature. In some examples, the systems described herein may analyze multiple executable files according to the methods described herein and identify strings that are common to the executable files classified as malicious but that are not common to the executable files not classified as malicious.

Figure 6:
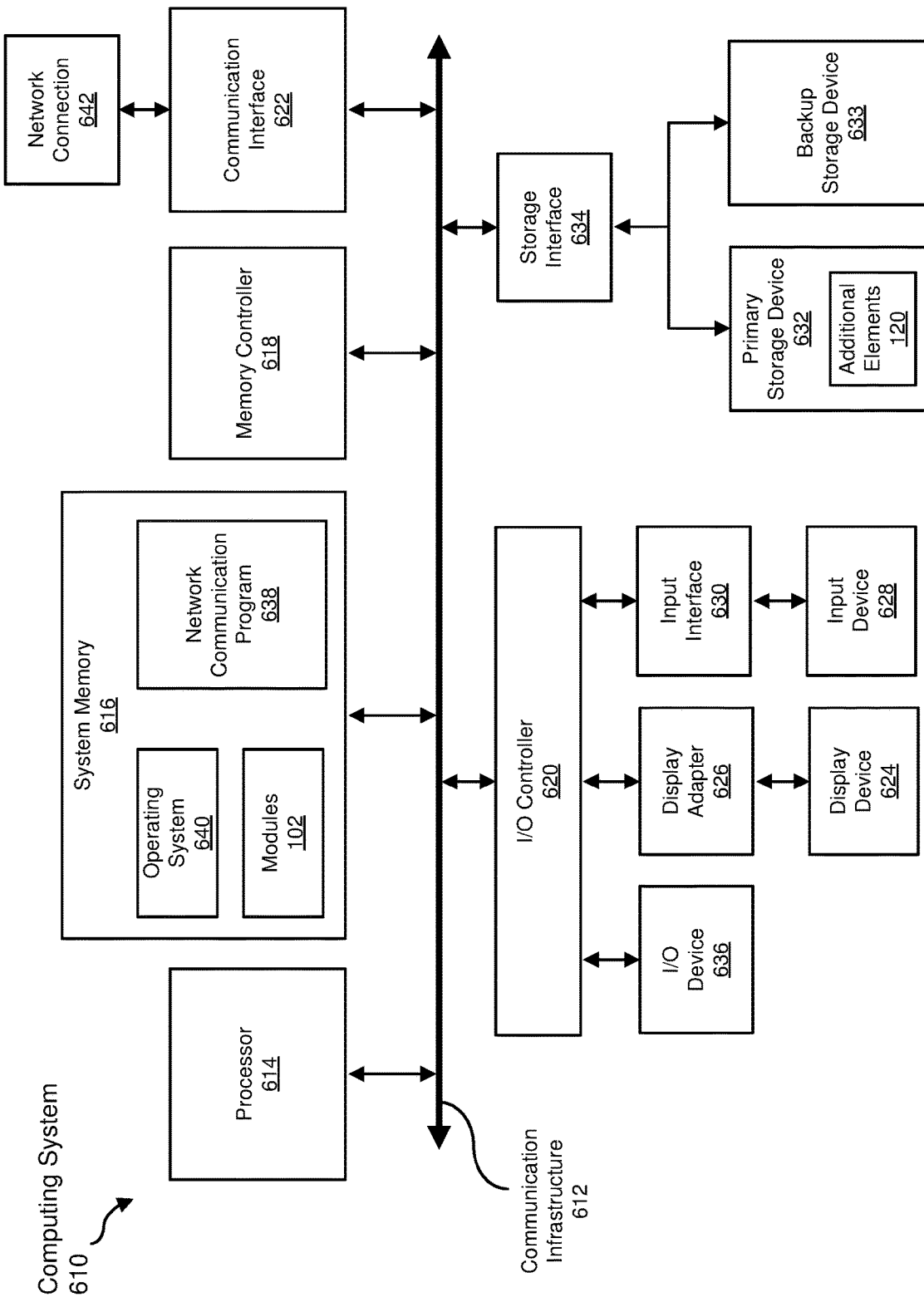
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
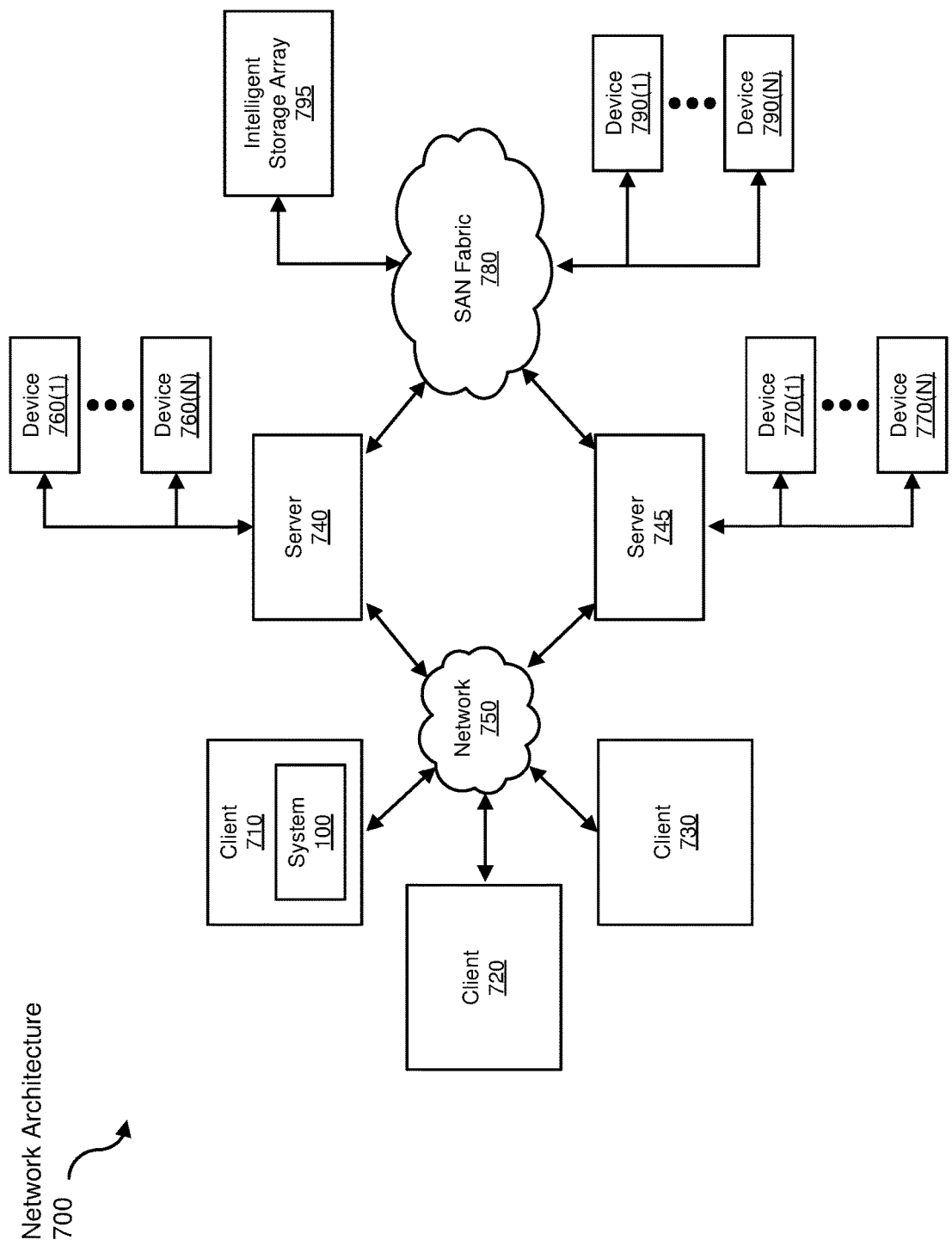
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting malware using static analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive an executable file to be transformed, transform the executable file into a data structure mapping one or more method invocation and/or data propagation paths implemented by the executable file, output a result of the transformation, use the result of the transformation to classify the executable file as malicious, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware using static analysis, at least a portion of the method being performed by a computing device comprising at least one processor, the method comprising:
    identifying an executable file to subject to analysis for malware;
    retrieving an association between a known malicious behavior and an exploitable method being invoked, wherein the association specifies that a contextual method precedes the exploitable method in an invocation path and that the exploitable method is invoked with a set of predetermined parameters;
    detecting, within the executable file, an invocation of the exploitable method;
    determining, based on analyzing contents of the executable file, that the invocation of the exploitable method within the executable file occurs in a detected invocation path in which the contextual method precedes the exploitable method and that the invocation of the exploitable method comprises a set of invoking parameters that matches the set of predetermined parameters;
    classifying the executable file as containing malware in response to determining that the invocation of the exploitable method within the executable file occurs in the detected invocation path in which the contextual method precedes the exploitable method and that the exploitable method is invoked with the set of predetermined parameters; and
    generating a malware signature based on the contents of the executable file in response to classifying the executable file as containing malware.

2. The computer-implemented method of claim 1, further comprising performing a security action in response to classifying the executable file as containing malware.

3. The computer-implemented method of claim 2, wherein the security action comprises at least one of:
    blocking execution of at least one instance of the executable file;
    quarantining at least one instance of the executable file;
    blocking at least one behavior of at least one instance of the executable file;
    providing an alert indicating the executable file contains malware.

4. The computer-implemented method of claim 1, wherein determining that the invocation of the exploitable method comprises the set of predetermined parameters comprises:
    identifying, within the executable file, a data propagation path between a symbolic identifier used within the invocation of the exploitable method to designate an invoking parameter of the exploitable method and a concrete value;
    determining that the concrete value matches a predetermined parameter within the set of predetermined parameters corresponding to the invoking parameter.

5. The computer-implemented method of claim 1, wherein determining that the invocation of the exploitable method occurs in the detected invocation path comprises constructing a representation of a method call trace based on a static analysis of the executable file.

6. The computer-implemented method of claim 1, wherein determining that the invocation of the exploitable method occurs in the detected invocation path comprises determining that a preceding method call within the detected invocation path invokes a succeeding method call within the detected invocation path.

7. The computer-implemented method of claim 1, wherein:
    the executable file comprises class-based object-oriented executable instructions;
    detecting, within the executable file, an invocation of the exploitable method comprises identifying a name of a member of a class within the executable file.

8. The computer-implemented method of claim 7, wherein detecting, within the executable file, the invocation of the exploitable method comprises analyzing bytecode disassembled from the executable file.

9. The computer-implemented method of claim 1, wherein the association between the known malicious behavior and the exploitable method being invoked is based at least in part on an event that triggers the contextual method.

10. A system for detecting malware using static analysis, the system comprising:
- an identification module, stored in memory, that identifies an executable file to subject to analysis for malware;
- a retrieving module, stored in memory, that retrieves an association between a known malicious behavior and an exploitable method being invoked, wherein the association specifies that a contextual method precedes the exploitable method in an invocation path and that the exploitable method is invoked with a set of predetermined parameters;
- a detection module, stored in memory, that detects, within the executable file, an invocation of the exploitable method;
- a determination module, stored in memory, that determines, based on analyzing contents of the executable file, that the invocation of the exploitable method within the executable file occurs in a detected invocation path in which the contextual method precedes the exploitable method and that the invocation of the exploitable method comprises a set of invoking parameters that matches the set of predetermined parameters;
- a classification module, stored in memory, that classifies the executable file as containing malware in response to determining that the invocation of the exploitable method within the executable file occurs in the detected invocation path in which the contextual method precedes the exploitable method and that the exploitable method is invoked with the set of predetermined parameters;
- a generating module, stored in memory, that generates a malware signature based on the contents of the executable file in response to classifying the executable file as containing malware; and
- at least one physical processor that executes the identification module, the retrieving module, the detection module, the determination module, the generating module, and the classification module.

11. The system of claim 10, wherein the classification module further performs a security action in response to classifying the executable file as containing malware.

12. The system of claim 11, wherein the security action comprises at least one of:
- blocking execution of at least one instance of the executable file;
- quarantining at least one instance of the executable file;
- blocking at least one behavior of at least one instance of the executable file;
- providing an alert indicating the executable file contains malware.

13. The system of claim 10, wherein the determination module determines that the invocation of the exploitable method comprises the set of predetermined parameters by:
- identifying, within the executable file, a data propagation path between a symbolic identifier used within the invocation of the exploitable method to designate an invoking parameter of the exploitable method and a concrete value;
- determining that the concrete value matches a predetermined parameter within the set of predetermined parameters corresponding to the invoking parameter.

14. The system of claim 10, wherein the determination module determines that the invocation of the exploitable method occurs in the detected invocation path by constructing a representation of a method call trace based on a static analysis of the executable file.

15. The system of claim 10, wherein the determination module determines that the invocation of the exploitable method occurs in the detected invocation path by determining that a preceding method call within the detected invocation path invokes a succeeding method call within the detected invocation path.

16. The system of claim 10, wherein:
- the executable file comprises class-based object-oriented executable instructions;
- the detection module detects, within the executable file, an invocation of the exploitable method by identifying a name of a member of a class within the executable file.

17. The system of claim 16, wherein the detection module detects, within the executable file, the invocation of the exploitable method by analyzing bytecode disassembled from the executable file.

18. A non-transitory computer-readable medium comprising one or more computer-readable instructions that, when executed by at least one processor of a computing device, cause the computing device to:
- identify an executable file to subject to analysis for malware;
- retrieve an association between a known malicious behavior and an exploitable method being invoked, wherein the association specifies that a contextual method precedes the exploitable method in an invocation path and that the exploitable method is invoked with a set of predetermined parameters;
- detect, within the executable file, an invocation of the exploitable method;
- determine, based on analyzing contents of the executable file, that the invocation of the exploitable method within the executable file occurs in a detected invocation path in which the contextual method precedes the exploitable method and that the invocation of the exploitable method comprises a set of invoking parameters that matches the set of predetermined parameters;
- classify the executable file as containing malware in response to determining that the invocation of the exploitable method within the executable file occurs in the detected invocation path in which the contextual method precedes the exploitable method and that the exploitable method is invoked with the set of predetermined parameters; and
- generate a malware signature based on the contents of the executable file in response to classifying the executable file as containing malware.

* * * * *